United States Patent
Deeg et al.

(10) Patent No.: US 11,719,356 B2
(45) Date of Patent: Aug. 8, 2023

(54) PLATE ARMATURE DAMPING DEVICE FOR A TILTING ARMATURE VALVE, PLATE ARMATURE, AND TILTING ARMATURE VALVE WITH A PLATE ARMATURE DAMPING DEVICE

(71) Applicant: Knorr-Bremse Systeme Fuer Nutzfahrzeuge GmbH, Munich (DE)

(72) Inventors: Markus Deeg, Eberdingen (DE); Ralf Woerner, Tiefenbronn (DE); Julian Soehnlein, Schwieberdingen (DE); Friedbert Roether, Cleebronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/446,144

(22) Filed: Aug. 26, 2021

(65) Prior Publication Data

US 2022/0074515 A1 Mar. 10, 2022

(30) Foreign Application Priority Data

Sep. 7, 2020 (DE) .......................... 102020123249.7

(51) Int. Cl.
*F16K 31/06* (2006.01)
*F16K 47/00* (2006.01)

(52) U.S. Cl.
CPC ........ *F16K 31/0682* (2013.01); *F16K 47/012* (2021.08)

(58) Field of Classification Search
CPC .............................. F16K 31/0682; F16K 1/36
See application file for complete search history.

(56) References Cited

U.S. PATENT DOCUMENTS

| | | | |
|---|---|---|---|
| 3,472,523 A | 10/1969 | Rentschler et al. | |
| 2002/0134957 A1 | 9/2002 | Paessler et al. | |
| 2007/0239042 A1 | 10/2007 | Takahashi | |
| 2008/0073605 A1 | 3/2008 | Ishigaki et al. | |
| 2009/0014963 A1 | 1/2009 | Fietz | |
| 2012/0228533 A1 | 9/2012 | Ams et al. | |
| 2018/0180195 A1 | 6/2018 | Levien et al. | |
| 2019/0360609 A1* | 11/2019 | Roether | F16K 1/225 |

(Continued)

FOREIGN PATENT DOCUMENTS

| | | |
|---|---|---|
| CN | 107002902 A | 8/2017 |
| CN | 107110276 A | 8/2017 |

(Continued)

*Primary Examiner* — Reinaldo Sanchez-Medina
*Assistant Examiner* — Nicole Gardner
(74) *Attorney, Agent, or Firm* — Norton Rose Fulbright US LLP; Gerard Messina

(57) ABSTRACT

A plate armature damping device for a tilting armature valve includes at least one damping body which can be fixed to a plate armature, with at least one damping material which, on an impact movement of the plate armature in the direction of a counter-element, is elastically deformable on impact on the counter-element. The at least one damping body has a geometric contour including at least one bulge on a surface of the at least one damping body facing the counter-element, which is configured such that, on the impact movement of the plate armature, the volume of the at least one damping body contributing to the damping increases.

18 Claims, 4 Drawing Sheets

(56) References Cited

U.S. PATENT DOCUMENTS

2020/0023729 A1 1/2020 Motin et al.
2020/0025292 A1 1/2020 Maheshwari et al.

FOREIGN PATENT DOCUMENTS

| | | | |
|---|---|---|---|
| CN | 107420613 | A | 12/2017 |
| DE | 102005043969 | A1 | 3/2007 |
| DE | 102007000462 | A1 | 4/2008 |
| DE | 102011079339 | A1 | 1/2013 |
| DE | 102014210658 | A1 | 12/2015 |
| DE | 102014115206 | B3 | 2/2016 |
| DE | 102014115207 | A1 | 4/2016 |
| DE | 102016105532 | A1 | 9/2017 |
| DE | 102018123997 | A1 | 4/2020 |
| JP | S6455809 | A | 3/1989 |
| RU | 2282770 | C2 | 8/2006 |

\* cited by examiner

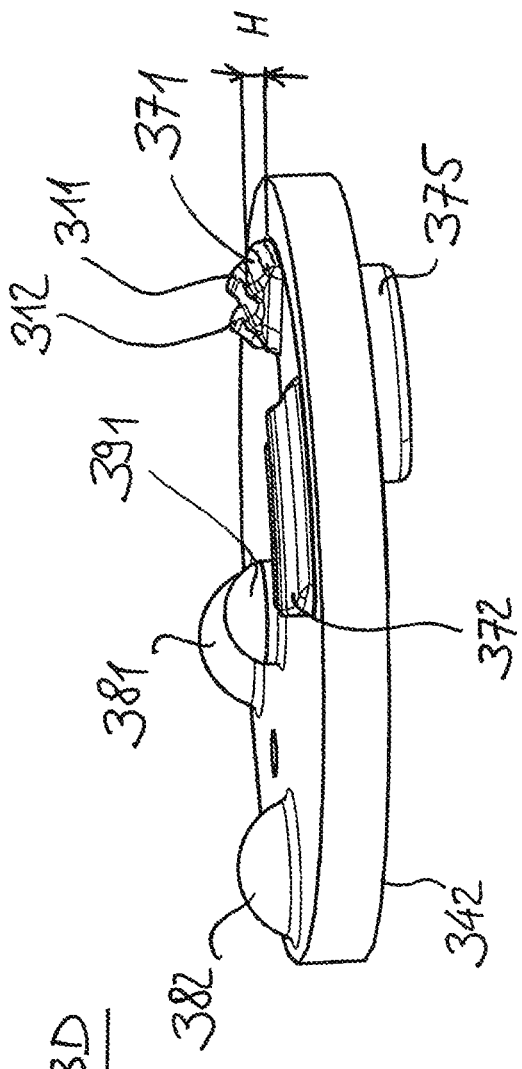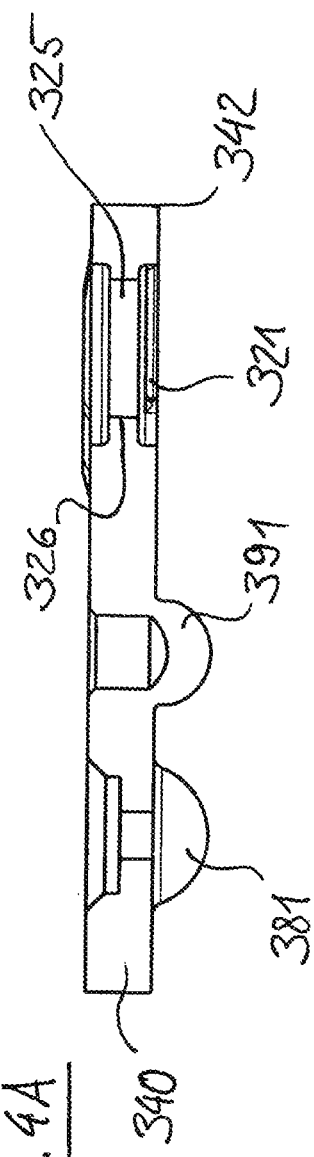

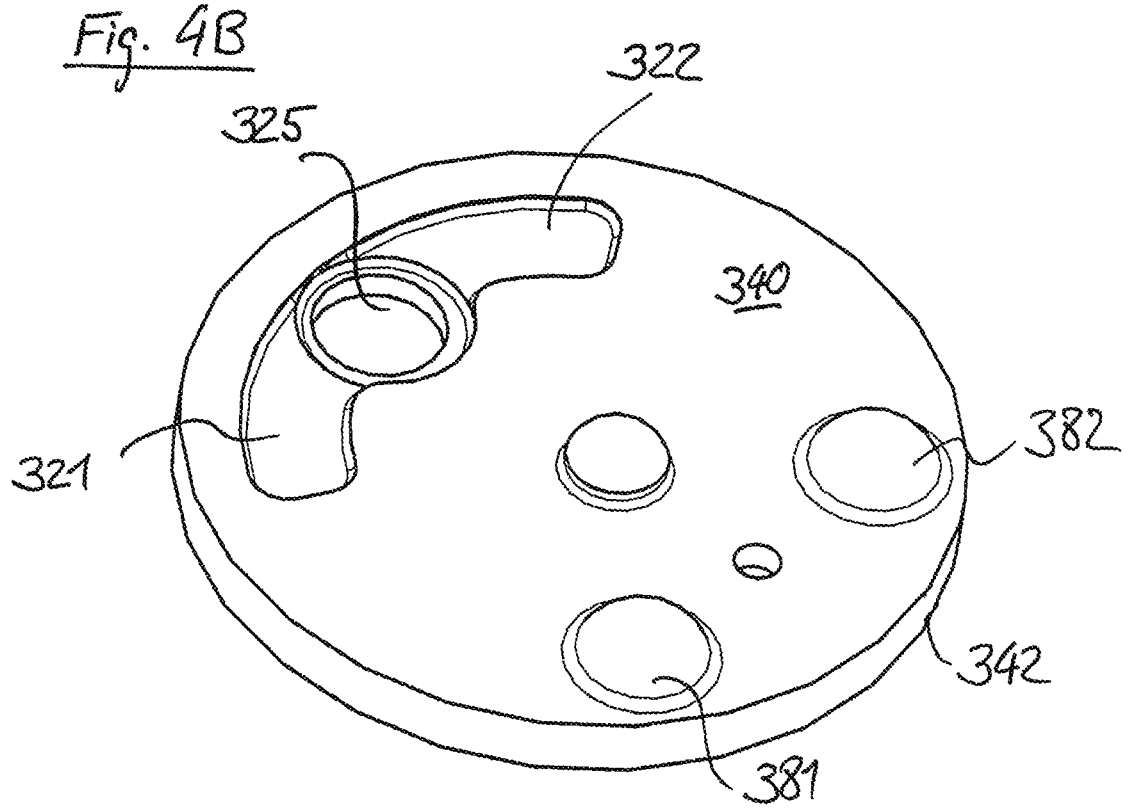
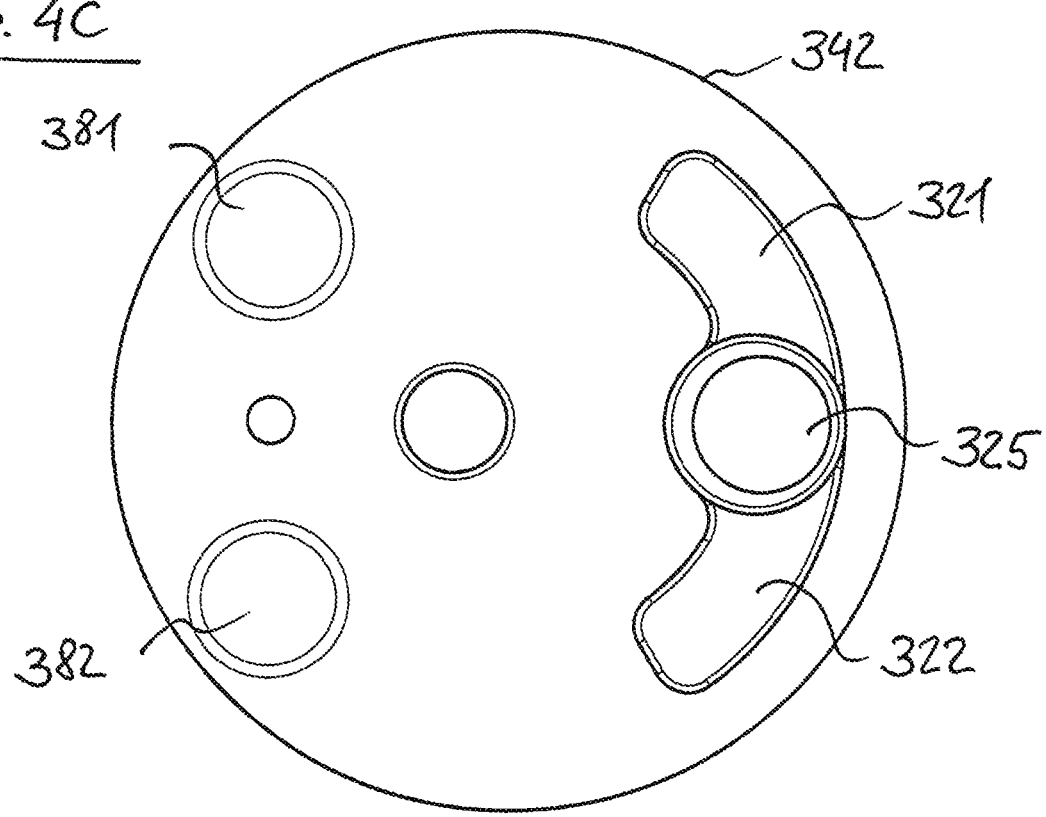

PLATE ARMATURE DAMPING DEVICE FOR A TILTING ARMATURE VALVE, PLATE ARMATURE, AND TILTING ARMATURE VALVE WITH A PLATE ARMATURE DAMPING DEVICE

FIELD OF THE INVENTION

The present invention concerns a plate armature damping device for a tilting armature valve, a plate armature, and a tilting armature valve with such a plate armature damping device.

BACKGROUND INFORMATION

Tilting armature valves are used for example as control valves for pressure regulation, such as in a vehicle, for example in a truck or bus for mass transport. For example, a brake system for a vehicle with an electronic service brake system includes at least one control valve for pressure regulation.

A tilting armature valve is discussed for example in DE 10 2014 115 206 B3, an object of which is to provide an improved control valve for a pressure regulating module of a vehicle. The tilting armature valve includes in particular a coil element with at least one coil core and a coil arranged radially around the coil core, an armature (so-called tilting armature) which is mounted at an end face of the armature by a bearing, wherein the armature can be moved from a first position to a second position by activation of the coil, and a spring for moving the armature which exerts a force on the armature in order to move the armature in the direction of the first position. A sealing element is arranged on the side of the armature facing away from the coil element. A valve seat with an output and an input for a fluid is formed in a half-shell, wherein the output can be closed fluid-tightly by the sealing element in the first position of the armature.

The tilting armature valve may have a damper element which is arranged on the side of the armature facing the coil element. The damper element may be formed such that, on a movement of the armature into the second position, it damps a mechanical oscillation of the armature, in particular a vibration and/or shaking and/or impact. The damper element may be arranged centrally on the armature. Thus the damper element may act on the coil core. The damper element may be arranged on the armature such that, on a movement of the armature into the second position, it acts on the coil, an end face of the coil or a perforated plate arranged on an end face of the coil. Thus at an end facing away from the bearing, the damper element may be arranged on a main face of the armature facing the coil.

The tilting armature principle with lateral armature mounting allows the moved mass of the tilting armature valve to be kept very low. Furthermore, a largely homogenously distributed magnetic field can be generated by the coil, which acts on the armature via the coil core. The spring generates a counter-force or valve closing force.

In addition, further types of such magnetic valves are as discussed for example in DE 10 2014 115 207 A1, DE 10 2018 123 997 A1, or DE 10 2016 105 532 A1.

Such tilting armature valves, or plate armatures in a tilting armature configuration, may have the problem that because of the angular movement of the plate armature or tilting armature, the force is introduced by the damper element at various regions. There are regions in which, because of the angular movement, the armature impacts the counter-element at different times. So constant damping by the damper element is difficult to achieve. A restricted damping may lead to deterioration in operation, e.g. if a poorly damped or undamped impact of the plate armature, on release of the brakes, is perceived by the bus passengers or passers-by as disruptive because of the harsh and loud body-borne noise.

SUMMARY OF THE INVENTION

The present invention is based on the object of indicating a plate armature damping device for a tilting armature valve, a plate armature, and a tilting armature valve with such a plate armature damping device, which allow an improvement in the damping behaviour and hence an improvement in the disruptive noise development at the tilting armature valve.

The invention concerns a plate armature damping device for a tilting armature valve, a plate armature and a tilting armature valve with such a plate armature damping device according to the appended independent claims. Advantageous embodiments and refinements of the invention are disclosed herein and in the description which follows.

In particular, an aspect of the present invention concerns a plate armature damping device for a tilting armature valve, including at least one damping body which can be fixed to a plate armature, with at least one damping material which, on an impact movement of the plate armature in the direction of a counter-element, is elastically deformable on impact on the counter-element. The at least one damping body has a geometric contour including at least one bulge on a surface of the at least one damping body facing the counter-element, which is configured such that, on the impact movement of the plate armature, the volume of the at least one damping body contributing to the damping increases.

Another aspect of the invention concerns a plate armature for a tilting armature valve, including an armature body which can be mounted on the tilting armature valve by a bearing at an end face of the armature body and is movable from a first position into a second position by activation of an electric coil element, and a plate armature damping device according to the invention which is arranged on a surface of the armature body so that, on an impact movement of the plate armature from the first position to the second position, the at least one damping body is elastically deformed on the impact on the counter-element.

In addition, the invention concerns a tilting armature valve with such a plate armature. The tilting armature valve may be configured as a tilting armature valve for a pressure regulating module of a vehicle.

The invention thus allows an improvement in the damping behaviour and hence an improvement in the disruptive noise development at the tilting armature valve, since the impact on the counter-element can be effectively sprung and damped by at least one damping body of the plate armature damping device which provides increasing damping with the impact movement. In the impact movement, the at least one bulge of the geometric contour, at which the plate armature first comes into contact with the counter-element, ensures over the time that an ever increasing volume of the damping material becomes involved in and active for the damping effect, so that the impact movement of the plate armature can be braked in aa targeted manner. Here it is advantageous that firstly a smaller area or smaller volume is active for the damping, and this becomes larger during the impact movement.

Such a geometric contour is advantageous in particular in a plate armature in a tilting armature configuration, since even with a non-parallel configuration of the plate armature to the counter-element, the contour is still suitable for the angular motion of the tilting armature. In a configuration of the at least one damping body with rubber as the damping material, because of the damping contour, firstly a smaller rubber area comes to rest on the counter-element, whereby better damping is possible. According to one embodiment, damping is even possible in several stages.

According to one embodiment, the at least one bulge on the surface of the at least one damping body facing the counter-element is configured such that, during the impact movement of the plate armature, initially a first part of the damping material at the at least one bulge is elastically deformed, and during the further course of the impact movement, a second part of the damping material, larger than the first part, is elastically deformed.

According to an embodiment, initially the damping is only slight, for example with a first bulge with an arrangement and function as described above. In addition, a second bulge is provided which is also arranged on the surface of the at least one damping body facing the counter-element, next to the first bulge, and is configured such that during the impact movement of the plate armature, initially a first part of the damping material at the second bulge is elastically deformed and in the further course of the impact movement, a second part of the damping material, larger than the first part, is elastically deformed. With such a double structure, the area effective for the damping can be enlarged, wherein however simultaneously the advantageous damping behaviour as a whole is substantially retained, such that initially a smaller area is active for damping which then increases during the impact movement.

According to an embodiment of the invention, the at least one bulge is arranged linearly along the surface of the at least one damping body. It may have a curved, in particular circular linear extent along the surface of the at least one damping body. Such a form is advantageous in particular in the case of a round plate armature, as used for example in a tilting armature valve with a cylindrical structure. For example, the at least one damping body may comprise one, two or more damping bodies which are arranged next to one another along the circumference of the plate armature.

According to one embodiment, it is provided that the at least one bulge protrudes in the normal direction of the plate armature such that the height of the bulge changes along the linear extent. In this way, advantageously, initially a smaller area may be effective for damping which increases in two components during the impact movement, namely once along the linear course of the bulge (for example, along the circle circumference of the plate armature) and secondly in the normal direction of the plate armature.

According to an embodiment with two or more bulges, it may be provided that the first bulge protrudes in the normal direction of the plate armature with a first height and the second bulge protrudes in the normal direction of the plate armature with a second height which is smaller than the first height. Here too, advantageously, it is achieved that initially a smaller area is effective for damping, which increases in two components during the impact movement, namely once starting from the first bulge to the second bulge (for example, from the outside to inside of the plate armature) and secondly in the normal direction of the plate armature.

According to an advantageous embodiment, these may also be combined so that during the impact movement, the area of the damping material is enlarged in three components.

In one embodiment, it is provided that the plate armature damping device furthermore includes a sealing body which is connected to the at least one damping body, wherein the sealing body is configured to close a valve opening fluid-tightly. The sealing body and the at least one damping body may be configured integrally. Thus the two materials—damping body firstly and sealing body secondly—are connected together. Thus both the damping body and the sealing body may be produced economically since, on use of rubber as a damping or sealing material, only one vulcanisation step is necessary.

According to one embodiment, also a retaining body is provided which is configured to be anchored in the plate armature. The at least one damping body and the sealing body are connected, which may be done integrally, to the retaining body and configured such that they lie on opposite surfaces of the plate armature on fixing of the retaining body in the plate armature.

According to one embodiment, the sealing body and the at least one damping body are arranged offset to one another, viewed in the normal direction of the plate armature. The valve seat and damping body are also offset to one another, whereby the forces acting reciprocally on the damping body and sealing body are offset to one another in the normal direction, and an interaction in the damping and sealing material, in the form of alternating loads on the damping side firstly and valve side secondly, are reduced or significantly diminished because of the offset.

According to an advantageous embodiment, it is provided that the at least one damping body includes a first damping body and a second damping body which are each arranged offset to the sealing body, viewed in the normal direction of the plate armature.

For example, the first damping body and the second damping body are arranged offset on opposite sides of the sealing body. The sealing body may for example be flanked centrally by the two damping bodies. The damping forces thus do not act on the sealing body and vice versa, since these are arranged offset to the damping bodies.

According to an embodiment of the plate armature, it is provided that the armature body has at least one first recess in which the at least one damping body is arranged at least along a partial extent of the damping body. Thus it is possible that the damping body is effectively held in the armature body, wherein the recess firstly allows an improved fixing to the armature body, and secondly lateral forces acting on the counter-element on impact can be absorbed.

In an embodiment, it is provided that the armature body has a second recess or opening at which the sealing body is arranged on the surface of the armature body opposite the at least one damping body. The sealing body closes a valve opening of the tilting armature valve fluid-tightly. Here, the at least one first recess and the second recess or opening are offset to one another, viewed in the normal direction of the armature body.

Thus it is possible that the damping body and sealing body are effectively held in the armature body, while secondly damping forces thus do not act on the sealing body, but are introduced into the recess of the plate body and hence decoupled from the sealing body. Also, forces from the valve opening side do not act on the damping bodies, since these are held in the armature body offset to the sealing body.

The embodiments described herein may be applied either separately or in arbitrary combination with one another.

The invention is explained in more detail below with reference to the figures shown in the drawings.

BRIEF DESCRIPTION OF THE DRAWINGS

FIGS. 3A, 3B, 3C, and 3D show schematic illustrations of a plate armature with a plate armature damping device according to an embodiment of the present invention.

FIGS. 4A, 4B, and 4C show schematic illustrations of a plate armature according to an embodiment of the present invention, shown without plate armature damping device.

DETAILED DESCRIPTION

Figure 1:
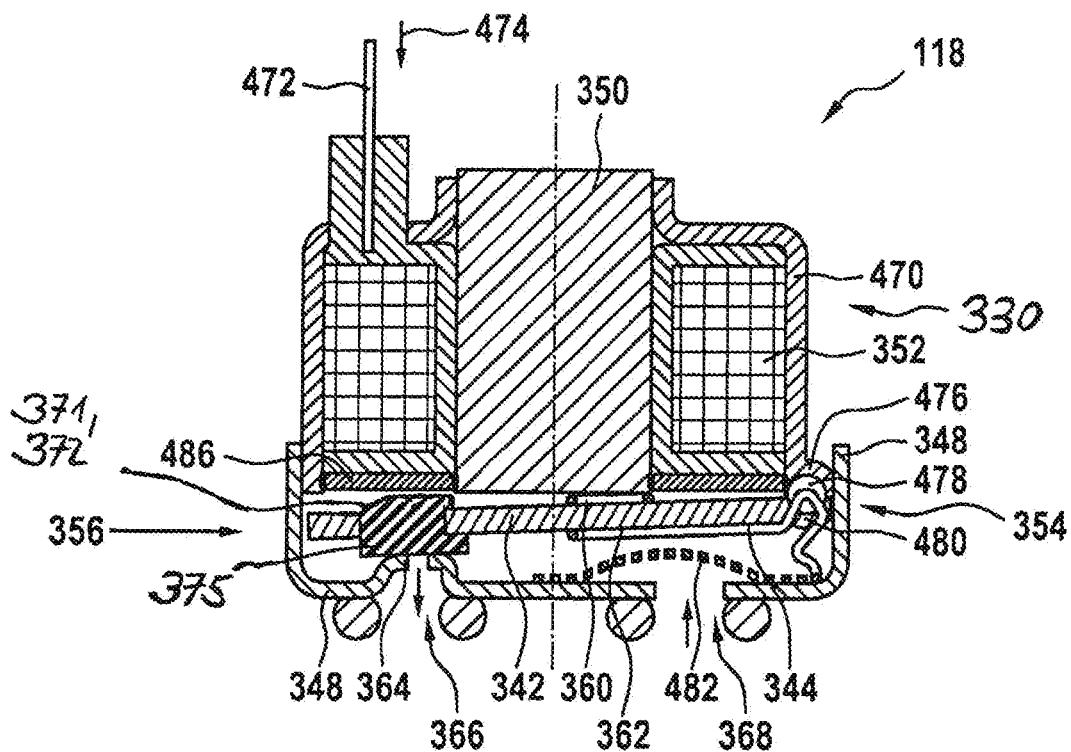
FIG. 1 shows a schematic, cross-sectional depiction of an exemplary tilting armature valve according to an exemplary embodiment of the present invention.

FIG. 1 shows a simplified cross-sectional illustration of a tilting armature valve 118 according to an exemplary embodiment of the present invention. The tilting armature valve 118 may be an exemplary embodiment of a tilting armature valve 118 in DE 10 2014 115 206 B3. In a variant, it may be an inlet magnetic valve marked with reference sign 112 in FIG. 1 there. Such embodiments of a magnetic valve discussed in DE 10 2014 115 206 B3 and their components and uses form part of the disclosure of the present invention by reference.

The embodiment of a tilting armature valve 118 shown in FIG. 1 has a housing formed from a half-shell 348 and a further half-shell 470. In one exemplary embodiment, the half-shell 348 and the further half-shell 470 are connected together fluid-tightly by laser welding. A coil arrangement 330 is arranged in the further half-shell 470. The coil element 330 includes a coil core 350 and a coil 352 arranged in a ring around the coil core. The further half-shell 470 is almost completely filled by the coil element 330. The coil element 330 has a terminal 472 for receiving a control signal 474. Depending on the status of the control signal 474, the coil 352 is switched to be non-energised or energised. In the further half-shell 470, a first bearing half-shell 476 for a needle roller 474 is formed on one side. On an end face of the coil element 330 or coil 352, adjacent to the first bearing half-shell 476, a plate armature 342 is arranged, referred to below also in brief as the armature. A second bearing half-shell 480 is formed in the armature 342. The first bearing half-shell 476, the needle roller 478 and the second bearing half-shell 480 together form a bearing 354. The bearing 354 is merely exemplary. The armature 342, as will be explained in more detail below, may also be mounted by another bearing arrangement.

A spring 344 is arranged on the armature 342. A first part region 360 of the spring 344 is arranged on the side of the armature 342 facing the coil element 330. A second part region 362 of the spring 344 is arranged on the side of the armature 342 facing away from the coil element 330. In the exemplary embodiment shown here, the spring 344 is a bent wire element. An input 368 is formed in the half-shell 348, and an output 366 in a valve opening 364 (so-called valve seat). A fine screen 482 is arranged at the input 368. For example, the fine screen 482 is connected to the half-shell 348 via a resistance welding method.

A sealing body 375 and at least one damping body 371, 372 are arranged on the armature 342, as will be explained in more detail below. The sealing body 375 is arranged on the side of the armature 342 facing away from the coil element 330. Furthermore, the damping body or bodies 371, 372 is/are arranged on the side of the armature 342 facing the coil element 330. In the exemplary embodiment depicted, the sealing body 375 and the damping body or bodies 371, 372 are configured integrally. They may however also be formed separately from one another and fixed to the armature 342. In one exemplary embodiment, both the sealing body 375 and the damping body or bodies 371, 372 are made of an elastomer, for example rubber.

The armature 342 is shown in a first position 356. In the first position 356, the sealing body 375 is arranged with respect to the valve seat 364 so as to close this fluid-tightly. A surface of the valve seat 364, on which the sealing body 375 bears when the armature 342 is arranged in the first position 356, has for example an angle of 2° to the main extent plane of the half-shell 348. It may also be advantageously provided that the surface of the sealing body 375 on the valve seat side is formed sloping (as indicated in FIG. 3B) so that it is planar-parallel to the valve seat. Thus a sloping impact angle at the valve seat may be compensated in order to achieve a tightness even from the start.

In the exemplary embodiment shown in FIG. 1, a perforated plate 486 is arranged on the end face of the coil element 330. The perforated plate 486 has an opening in the diameter of the coil core 350. The perforated plate 486 is connected to the further half-shell 470 and to the coil core 350. In a favourable exemplary embodiment, the perforated plate 486 is connected to the further half-shell 470 and the coil core 350 such that the coil 352 is separated fluid-tightly from a chamber created by the half-shell 348 and containing the armature 342. The perforated plate 486 consists of a magnetically non-conductive material. The half-shell 348 may also consist of a magnetically non-conductive material.

The tilting armature valve 118 shown in FIG. 1 is based on a basic principle of an electrical relay. With the exception of the coil 352, in one exemplary embodiment the elements of the tilting armature valve 118 are made of steel. Advantageously, these are thereby resistant to high temperatures and have a high surface quality. A needle roller 478 serves as an armature bearing in a similar manner to needle roller bearings. This spring 344, made of a form-bent wire in one exemplary embodiment, fixes the armature 342, and the spring 344 also creates a valve closing force of the tilting armature valve 118. Both the housing formed from the half-shell 348 and the further half-shell 470, and the armature 342, are punched or deep-drawn plate parts. Advantageously, the components of the tilting armature valve 118 are connected together by laser welding.

By arranging a round coil 330 in a largely round further half-shell 470, a magnetic circuit is optimised by a largely homogenously distributed magnetic field. Thus the arrangement of the coil 330 in the further half-shell 470, together with the armature 342, follows a pot-and-lid principle and leads to minimisation of the coil and costs. In addition to the basic principle of the tilting armature valve 118 shown in FIG. 1 as a normally open valve or an inlet/outlet valve, as in DE 10 2014 115 206 B3, it is also easy to configure the tilting armature valve 118 as a normally closed valve, for example for backup use, or as a changeover valve for universal use.

The tilting armature valve 118 shown here provides an economic overall solution due to the optimum use of magnetic force with minimal coil and housing size. The robust basic principle is distinguished by a high resistance to vibration by the half-shell bearing, and the possible high switching rates. The high switching rates are obtained for example by the large bearing contact area with a small travel distance of the armature 342.

Figure 2:
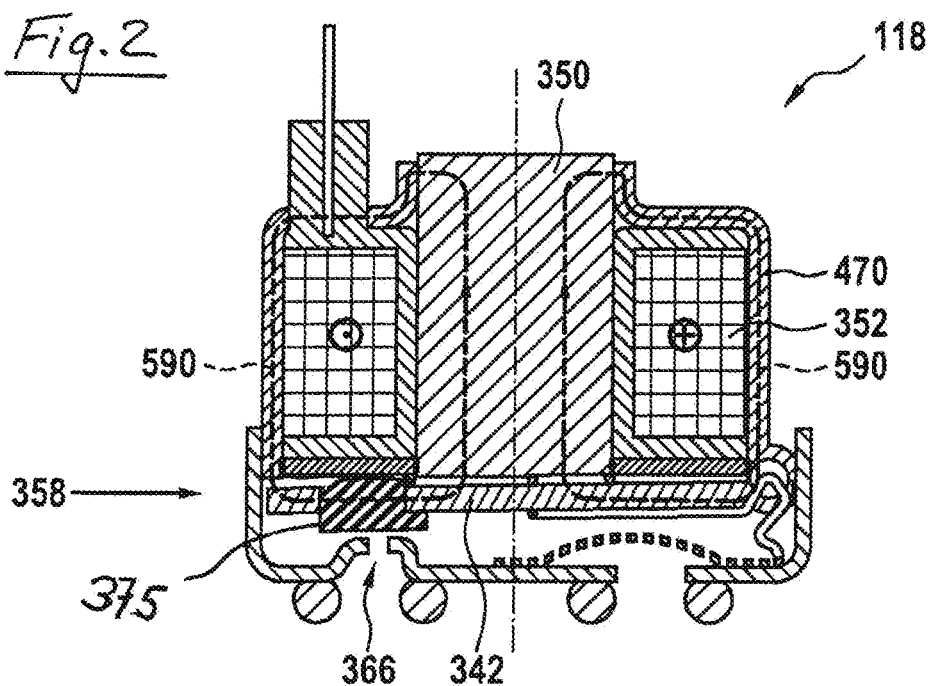
FIG. 2 shows a schematic, cross-sectional depiction of an energised tilting armature valve with indicated magnetic flux, according to an exemplary embodiment of the present invention.

FIG. 2 shows a schematic cross-sectional illustration of an energised tilting armature valve 118 with indicated magnetic flux 590 according to one exemplary embodiment of the present invention. The depiction of the tilting armature valve 118 in FIG. 2 corresponds to the depiction of the tilting armature valve 118 in FIG. 1, with the difference that the armature 342 is positioned in the second position 358 since the coil 352 is in an energised state. A dotted line indicates the magnetic flux 590 around the coil 352. The magnetic flux 590 is conducted substantially via the coil core 350 and the further half-shell 470. Here, a magnetic force acts on the armature 342 and moves this into the second position 358, or alternatively the magnetic force holds the armature 342 in the second position 358. The coil core 350, the further housing shell 470 and the armature 342 comprise a magnetically conductive material. When the armature 342 is positioned in the second position 358, the output 356 is opened and the tilting armature valve 118 is switched to passage or through-flow.

Figure 3A:
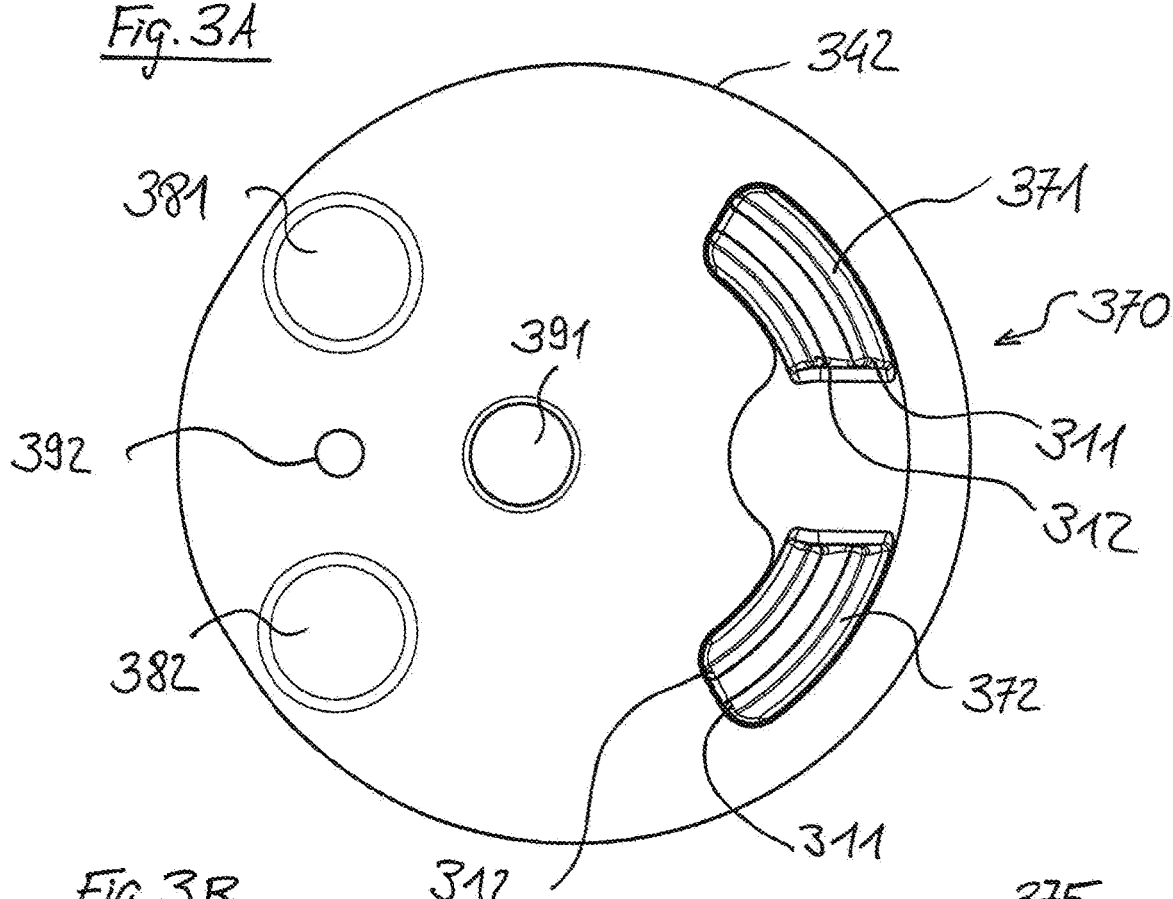
Figure 3B:
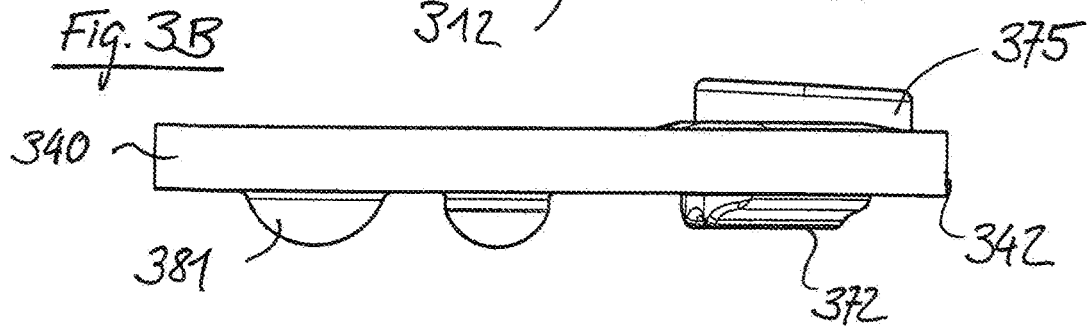

FIGS. 3A-D each show schematic illustrations of a plate armature with a plate armature damping device according to one embodiment of the present invention, while FIGS. 4A-C each show schematic illustrations of a plate armature without plate armature damping device, i.e. only the armature body itself, according to one embodiment of the present invention. FIGS. 3A, 4C show a top view of the plate armature with and respectively without the plate armature damping device, FIGS. 3D, 4B show a perspective view, and FIGS. 3C, 4A a cross-sectional view. FIG. 3B shows the plate armature in a side view.

The plate armature 342, as may be used in the principle of a tilting armature valve 118 according to FIGS. 1 and 2, has an armature body 340, which may be made of magnetic material, which can be mounted at an end face of the armature body 340 by a bearing on the tilting armature valve 118, and can be moved from the first position 356 to the second position 358 by activation of the electrical coil element 330. The mounting shown in FIGS. 1, 2 is merely exemplary. A further possibility of mounting a plate armature 342 according to the embodiment of FIGS. 3 and 4 is discussed below, as in particular in DE 10 2016 105 532 A1.

The armature 342 has at least one, in this embodiment two, at least partially round protrusions 381, 382 in a bearing portion, wherein the protrusions 381, 382 favourably engage in a respective recess or opening (see FIG. 1A of DE 10 2016 105 532 A1: protrusion 160 and recess 165) arranged in a portion of the housing of the tilting armature valve 118 opposite the protrusions 381, 382. Thus on a movement from the first position 356 to the second position 358 after application of a current flow through the coil 330, the armature 341 may slide into the recess and at the same time be held at a fixed position in the housing. In the exemplary embodiment, the protrusions 381, 382 may be formed as respective balls which are pressed or glued into the material of the armature body 340 in the bearing portion. It is also conceivable that the balls are welded to the material of the armature body 340. The respective balls may be made of a metal, e.g. steel, and/or comprise a different material from the armature 342. For this, the material of the balls may be selected according to a criterion of minimum possible wear, whereas the material of the armature 342 may be selected according to a criterion of optimal or maximal magnetic flux. It is however also conceivable that instead of a ball, the protrusions 381, 382 are formed solely by a unilateral embossing in the material of the armature body 340. In this way, a separate embedding of a respective ball in the material of the armature 342 may be omitted but nonetheless an at least partially round protrusion above a surface of the armature body 340 may be formed, which fulfils the same functions as a ball.

A spring (not shown; cf. spring 120 according to FIG. 1 of DE 10 2016 105 532 A1) may serve for play-free pressing of the bearing ball(s) pressed e.g. into the armature body 340 into the (e.g. trapezoid) counter-shell or recess in the housing. The armature 342 may be fixed by the spring so that the armature 342 is held by the spring in a predefined position. This offers the advantage that a constant pretension force may be exerted on the armature 342, and the force exerted by the spring on the armature 342 may be introduced into the armature 342 as closely as possible to a force application point lying on the rotational axis. Also, a protrusion 391 and/or an opening 392 may be provided for better engagement of a spring on the armature body 340. Alternatively, the armature 342 may also be suspended from the coil element 330. In this case, the spring, which is configured for example as a leaf spring, may then be omitted.

FIGS. 3A-3D show, as well as the armature body 340 which may be configured as described, a plate armature damping device 370 according to an exemplary embodiment of the present invention, which is arranged on a surface of the armature body 340.

For this, the armature body 340 may have at least one recess in which a damping body can be partially introduced and secured. In the present embodiment, the damping device 370 may include two damping bodies 371, 372, as will be explained in more detail below. These are provided accordingly in a first recess 321 and a second recess 322 in the armature body 340 (FIGS. 4A-4C), in each of which a damping body 371 or 372 is arranged, for example by gluing, at least along a partial extent of the respective damping body.

As well as the damping bodies 371, 372, the damping device 370 furthermore includes a sealing body 375 on the surface of the armature body 340 opposite the damping bodies; this has a function of sealing of the valve seat 364 fluid-tightly, as described with respect to FIG. 1. The damping body or bodies 371, 372 may be integrally connected to the sealing body 375, as shown in the cross-sectional illustration of FIG. 3C. This connection is implemented by a co-moulded retaining body 376 which is fixed to a shoulder 326 of the armature body 340 and thus achieves a certain mutual decoupling between the damping bodies 371, 372 and sealing body 375. The retaining body 376 is anchored in the armature body 340, and the damping bodies 371, 372 and sealing body 375 are connected together via the retaining body 376, so that on fixing of the retaining body 376 in the armature body 340, they lie on opposite faces of the armature body 340.

For this, the armature body 340 includes a further recess or opening 325 (FIGS. 4A-C) at which the sealing body 375 is arranged on the surface of the armature body 340 opposite the damping bodies 371, 372 (FIGS. 3B, 3D). Advantageously, the recesses 321, 322 and the recess or opening 325 are arranged offset to one another viewed in the normal direction of the armature body 340, as shown in FIGS. 4B, 4C. Thus the sealing body 375 and the damping bodies 371, 372 are also arranged offset to one another in the normal direction of the armature 342. The normal direction is the direction of a top view onto the armature body 340, or the direction perpendicularly to the surface of the armature body 340. Thus also the forces acting reciprocally on the damping bodies 371, 372 and sealing body 375 in the normal direction are offset to one another, and an interaction in the damping and sealing material in the form of alternating loads on the damping side firstly and the valve side secondly, is reduced or significantly diminished because of the offset. In particular, forces which act on the damping bodies 371, 372 are received by the recesses 321 and 322 and kept away from the sealing body, while conversely forces acting on the sealing body 375 from the valve seat side in the normal direction of the armature body 340 are largely absorbed by the shoulder 326 and kept away from the damping bodies 371, 372 by the offset opening 325.

With reference to FIGS. 3A-3D, an embodiment of the plate armature damping device 370 according to the invention will now be described in more detail, which may be used in the tilting armature valve according to FIGS. 1 and 2. This has at least one damping body for damping impacts of the armature 342 on a counter-element, here on the perforated plate 486 of the coil element 330. Depending on the configuration of the tilting armature valve, other components, such as e.g. a housing and/or the coil element, may serve as a counter-element. In the present exemplary embodiment, as already described above, two damping bodies 371, 372 are provided which are arranged offset to the sealing body 375. In particular, the first damping body 371 and the second damping body 372 are arranged offset in the normal direction of the armature 342, on opposite sides of the sealing body 375.

The damping material of the damping bodies is composed such that, on an impact movement of the armature 342 in the direction of the perforated plate 486, it is elastically deformed on impact on the perforated plate so as to damp the impact. In addition, to improve the damping behaviour, the damping bodies 371, 342 each have a geometric contour which is configured substantially the same on both damping bodies but may also be different. The geometric contour includes at least one bulge on a surface of the respective damping body 371, 372 facing the counter-element and hence the perforated plate 486. In principle, one bulge is sufficient for the damping function described below. In the present exemplary embodiment, however, a particular embodiment was selected in which a first bulge 311 and a second bulge 312 are provided, arranged next to one another on the surface of the respective damping body 371, 372 facing the perforated plate 486. The bulges are configured such that on the impact movement of the armature 342, the volume of the respective damping body 371, 372 which contributes to damping increases. In particular, the bulges are configured such that, during the impact movement of the armature 342 starting from the first position 356 to the second position 358, on impact on the perforated plate 486, initially a first part of the damping material at the respective first or second bulge 311, 312 is elastically deformed, and in the further course of the impact movement, a second part of the damping material, larger than the first part, is elastically deformed. Thus the respective bulge is compressed on impact on the perforated plate, whereby an ever greater volume or ever greater part of the damping material is involved in the impact movement and compressed, whereby the damping effect is increased over the impact movement. Thus firstly a smaller rubber area comes to bear on the counter-element, whereby a better damping and damping in several stages is possible. Initially the damping is only slight, wherein the damping effect increases successively with the impact movement.

A bulge according to the invention is a bead-like protrusion, elevation or deformation on the damping material which leads to the elastic deformation initially of only a part of the damping material which first comes into contact with the counter-element at the bulge because of the shorter distance. In principle, the bulge may have any shape, may e.g. be rounded (as shown in the figures) or also angular. It may be formed integrally by moulding from correspondingly formed damping material of the damping body, or be moulded onto the damping body.

Figure 3C:
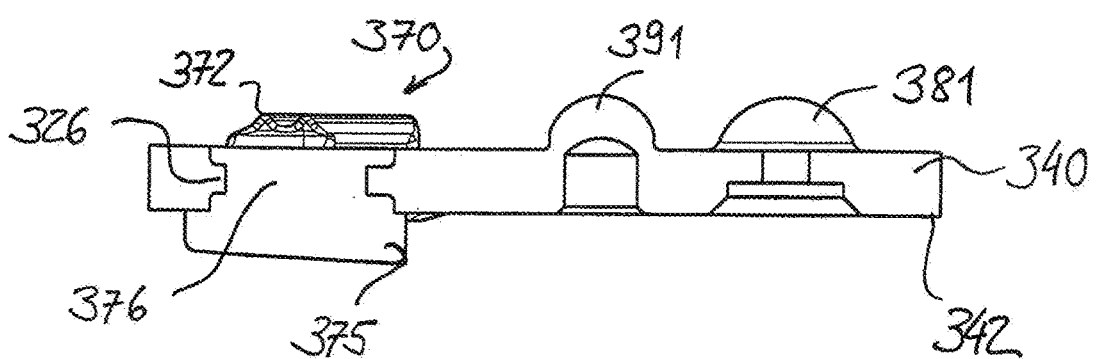

As shown further in FIGS. 3A, 3C, 3D, the bulges 311, 312 are arranged linearly along the surface of the respective damping body 371, 372. Since the armature 342 has a circular form adapted to the cylindrical form of the tilting armature valve 118, in particular a bent, circular linear extent of the respective bulge along the surface of the respective damping body 371, 372 is advantageous.

As well as a configuration of the geometric form of the bulge, in one or more of the damping bodies, it may be provided that one or more of the bulges 311 and/or 312 protrude in the normal direction of the armature 342 with a height (cf. height H in FIG. 3D) which changes along the linear extent. In other words, the apex of the respective bulge 311 and/or 312 has a height H, measured from the surface of the armature body 340, which changes along the linear extent. For example, the linear apex of the bulge 311 and/or 312 slopes in relation to the surface of the armature body 340, so that e.g. the circumferentially outer higher region of the bulge comes into contact with the counter-element 486 earlier than the inner lower region adjoining the sealing body 375. The height H in this region is thus lower than the height H in the circumferentially further remote region of the bulge. In this way, advantageously, initially a smaller area of the respective damping body may be effective for damping, which increases in several components or directions during the impact movement, namely once along the linear course of the bulge and secondly in the normal direction of the armature.

In addition, alternatively or in combination therewith, it may be advantageous if one of the bulges, such as the bulge 311, protrudes in the normal direction of the armature 342 with a first height H, and the respective other bulge, here the bulge 312, protrudes with a second height H which is smaller than the first height H (here of the bulge 311). In other words, the apex of the bulge 311 at least in a part region has a different height H, measured from the surface of the armature body 340, than the apex of the bulge 312. Here too, it is advantageously achieved that initially a smaller area of the respective damping body is effective for damping, which increases in several directions during the impact movement, namely once starting from the first bulge to the second bulge (for example, from outside to inside) and secondly in the normal direction of the armature.

With the bulges 311, 312 lying next to one another, on compression of the damping material on impact of the armature 342 on the counter-element, advantageously an air exchange can take place along the resulting channel between the bulges 311, 312. With the bulges, thus a reduced air displacement takes place because of a smaller impact area. Both factors also contribute to reducing noise on impact of the armature.

Thus the damping device 370 serves as an elastically deformable stop for the plate armature 342. In this way, the vibrations of the plate armature and disruptive noise developments, in particular body-borne noise, as may be triggered for example by impacts or vibrations or on rapid movements of the plate armature into the opening position, may be suppressed or prevented.

THE LIST OF REFERENCE SIGNS IS AS FOLLOWS

118 Tilting armature valve
311, 312 Bulge
321, 322 Recess
325 Opening
326 Shoulder 348, 470 Half-shell
330 Coil element
340 Armature body
342 Plate armature
344 Spring
350 Coil core
352 Coil
354 Bearing
356 First position
358 Second position
360, 362 Part region of the spring
364 Valve seat
366 Output
368 Input
370 Plate armature damping device
375 Sealing body
376 Retaining body
371, 372 Damping body
381, 382 Protrusion
391 Protrusion
392 Opening
472 Terminal
474 Control signal
476, 480 Bearing half-shell
478 Needle roller
482 Fine screen
486 Perforated plate
590 Magnetic flux
H Height

What is claimed is:

1. A plate armature damping device for a tilting armature valve, comprising:
at least one damping body that is fixable to a plate armature, with at least one damping material which, on an impact movement of the plate armature in the direction of a counter-element, is elastically deformable on impact on the counter-element;
wherein the at least one damping body has a geometric contour having bulges on a surface of the at least one damping body facing the counter-element, which is configured such that, on the impact movement of the plate armature, the volume of the at least one damping body contributing to the damping increases, and
wherein each of the bulges extend along a curved linear extent of the at least one damping body, which is curved.

2. The plate armature damping device of claim 1, wherein the bulges on the surface of the at least one damping body facing the counter-element is configured such that, during the impact movement of the plate armature, initially a first part of the damping material at the bulges is elastically deformed, and during the further course of the impact movement, a second part of the damping material, larger than the first part, is elastically deformed.

3. The plate armature damping device of claim 1, wherein each of the bulges is arranged linearly along the surface of the at least one damping body, having a curved extent along the surface of the at least one damping body.

4. The plate armature damping device of claim 3, wherein each of the bulges protrudes in the normal direction of the plate armature with a height which changes along the linear extent.

5. The plate armature damping device of claim 1, wherein each of the bulges includes a first bulge and a second bulge which are arranged next to one another on a surface of the at least one damping body facing the counter-element and which are each configured such that, during the impact movement of the plate armature, initially a respective first part of the damping material at the first and second bulges is elastically deformed, and in the further course of the impact movement, a respective second part of the damping material, larger than the first part, is elastically deformed.

6. The plate armature damping device of claim 5, wherein the first bulge protrudes in a normal direction of the plate armature with a first height and the second bulge protrudes in the normal direction of the plate armature with a second height which is smaller than the first height.

7. The plate armature damping device of claim 1, further comprising:
a sealing body which is connected to the at least one damping body, wherein the sealing body is configured to close a valve opening fluid-tightly.

8. The plate armature damping device of claim 7, wherein the sealing body and the at least one damping body are configured integrally.

9. The plate armature damping device of claim 7, further comprising:
a retaining body configured to be anchored in the plate armature, and the at least one damping body and the sealing body are connected to the retaining body and configured such that they lie on opposite faces of the plate armature on fixing of the retaining body in the plate armature.

10. The plate armature damping device of claim 7, wherein the sealing body and the at least one damping body are arranged offset to one another, viewed in the normal direction of the plate armature.

11. The plate armature damping device of claim 7, wherein the at least one damping body includes a first damping body and a second damping body which are each arranged offset to the sealing body, viewed in the normal direction of the plate armature.

12. The plate armature damping device of claim 11, wherein the first damping body and the second damping body are arranged offset on opposite sides of the sealing body.

13. The plate armature damping device of claim 1, wherein each of the bulges is arranged linearly along the surface of the at least one damping body, having a curved, circular linear extent along the surface of the at least one damping body.

14. A plate armature for a tilting armature valve, comprising:
an armature body which can be mounted on the tilting armature valve by a bearing at an end face of the armature body and is movable from a first position into a second position by activation of an electric coil element; and
a plate armature damping device, which is arranged on a surface of the armature body so that, on an impact movement of the plate armature from the first position to the second position, the at least one damping body is elastically deformed on impact on the counter-element;
wherein the plate armature damping device, includes:
at least one damping body that is fixable to the plate armature, with at least one damping material which, on an impact movement of the plate armature in the direction of a counter-element, is elastically deformable on impact on the counter-element;
wherein the at least one damping body has a geometric contour having bulges on a surface of the at least one damping body facing the counter-element, which is configured such that, on the impact movement of the plate armature, the volume of the at least one damping body contributing to the damping increases, and
wherein each of the bulges extend along a curved linear extent of the at least one damping body, which is curved.

15. The plate armature of claim 14, wherein the armature body has at least one first recess in which the at least one damping body is arranged at least along a partial extent of the damping body.

16. The plate armature of claim 15, wherein the armature body has a second recess or opening, at which a sealing body is arranged on the surface of the armature body opposite the at least one damping body and is configured to close a valve opening of the tilting armature valve fluid-tightly, and wherein the at least one first recess and the second recess or opening are offset to one another in the normal direction of the armature body.

17. A tilting armature valve, comprising:
a plate armature, including:
an armature body, which is mountable on the tilting armature valve by a bearing at an end face of the armature body and which is movable from a first position into a second position by activation of an electric coil element; and
a plate armature damping device, which is arranged on a surface of the armature body so that, on an impact movement of the plate armature from the first position to the second position, the at least one damping body is elastically deformed on impact on the counter-element;
wherein the plate armature damping device, includes:
at least one damping body that is fixable to the plate armature, with at least one damping material which, on an impact movement of the plate armature in the direction of a counter-element, is elastically deformable on impact on the counter-element;
wherein the at least one damping body has a geometric contour having bulges on a surface of the at least one damping body facing the counter-element, which is configured such that, on the impact movement of the plate armature, the volume of the at least one damping body contributing to the damping increases, and
wherein each of the bulges extend along a curved linear extent of the at least one damping body, which is curved.

18. The tilting armature valve of claim 17, wherein the tilting armature valve is for a pressure regulating module of a vehicle.

* * * * *